Feb. 23, 1954          T. L. KINNE          2,669,822
COTTON HARVESTING MACHINE
Filed April 7, 1950          3 Sheets-Sheet 1
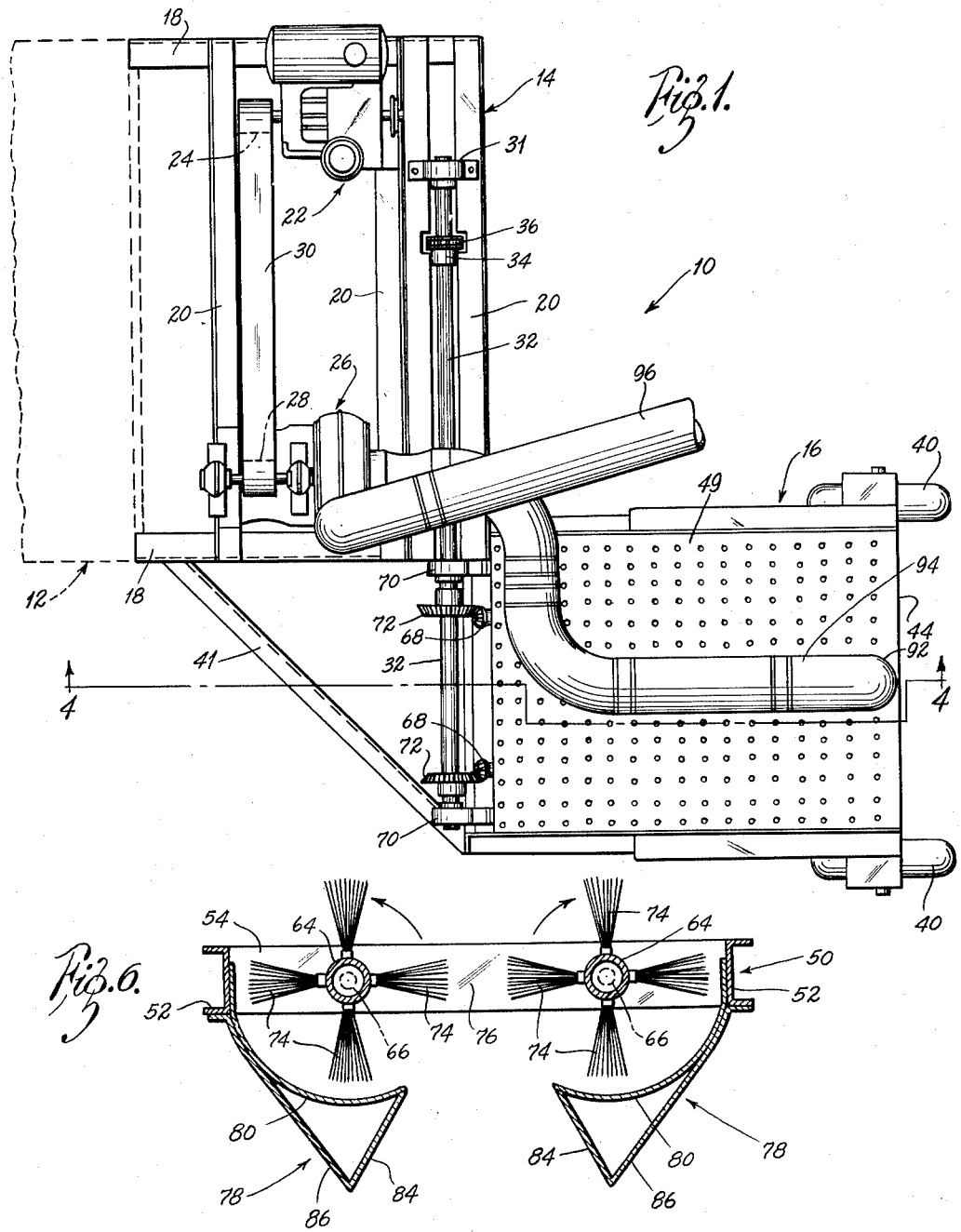
INVENTOR:
TEMPEL L. KINNE,
BY Kingsland, Rogers & Ezell
ATTORNEYS

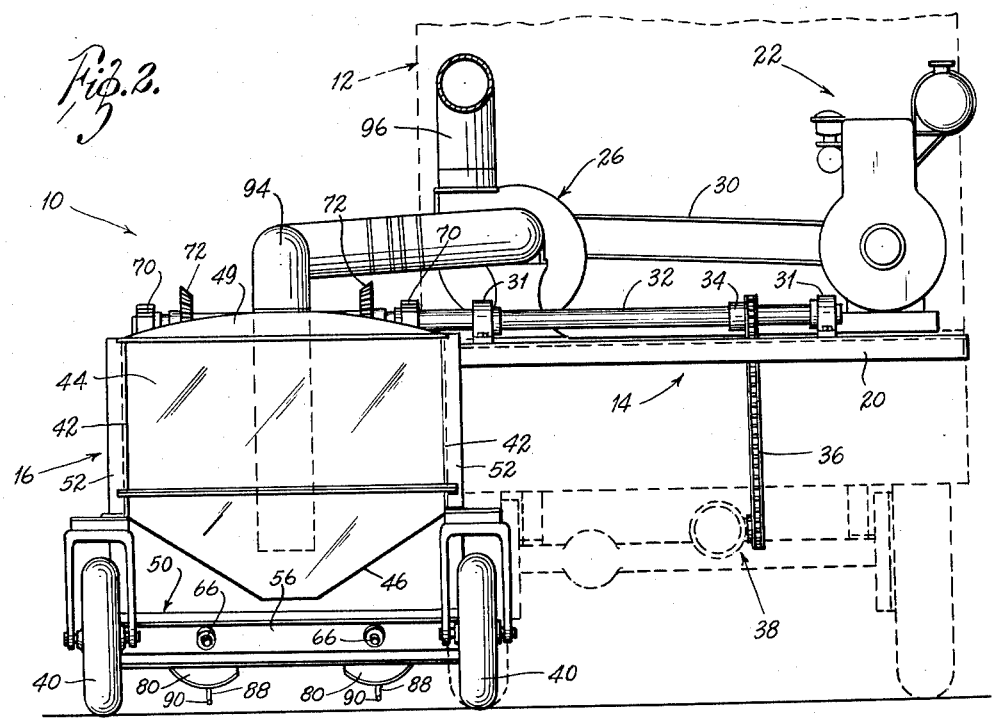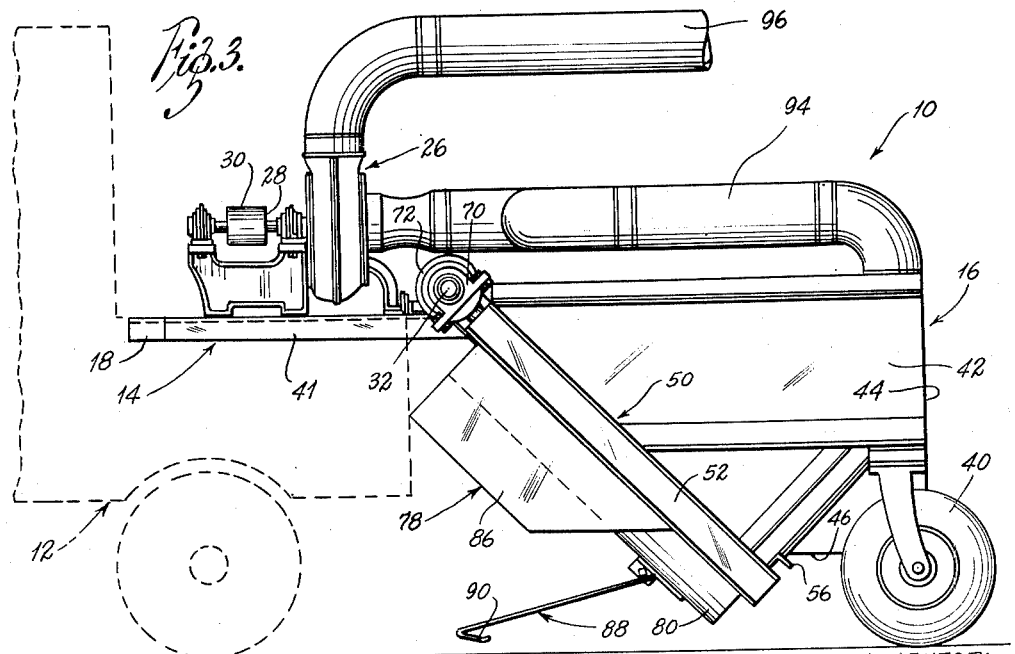

Patented Feb. 23, 1954

2,669,822

UNITED STATES PATENT OFFICE 2,669,822

COTTON HARVESTING MACHINE

Tempel Leroy Kinne, Dallas, Tex., assignor to John E. Mitchell Company, Dallas, Tex., a corporation of Missouri Application April 7, 1950, Serial No. 154,510

12 Claims. (Cl. 56—12)

1

The present invention relates generally to the harvesting machine art and more particularly to a novel cotton harvesting machine for use in those sections of the United States where the cotton plant is small, and contains very few limbs and relatively little foliage.

In one form, the cotton harvesting machine includes a suction pump supporting framework which is adapted to be supported on a light truck or the like, and a picking mechanism housing which is fastened to the framework at the rear and to one side thereof. The housing contains a pair of wheels adjacent the rear end thereof whereby it can be moved over a row of cotton plants. A pair of spaced brush supporting cylinders, with brushes mounted thereon, are rotatably mounted adjacent the front end of the housing, the brushes being arranged in a spiral about each cylinder. The cylinders are rotated simultaneously from a power take-off adjacent the rear axle of the truck through a series of gears and a shaft. The cylinders are disposed at an angle so that when the cotton plants pass between them, the brushes strip the cotton from the plants and hurl it upwardly and rearwardly therefrom. A perforated plate extends across the upper end of the housing and deflects the hurled cotton downwardly and rearwardly toward a sump at the rear of the housing, but permits dirt and some leaf trash to pass through the openings into the atmosphere. A suction pump and mechanism for driving it are mounted on the framework, and an inlet conduit extends from the pump into the sump for removing the cotton from it. An outlet conduit conveys the cotton from the pump to a point removed from the housing.

It is a well known fact that there is a great deal of difference between the cotton plants in the various parts of the United States. For example, in the Mississippi delta the foliage growth is very luxuriant so that in order to use a mechanical harvester, it is necessary to have one which contains spindles which are carried into the cotton plant and out of it without any motion of the machine relative to the plant itself. However, in the southwestern part of the United States, as for example the western part of Texas, the plants do not contain enough obstructions in the form of limbs and foliage to prevent a machine moving relative to the plants from making an effective contact with the cotton.

It is an object of the present invention, therefore, to provide a novel cotton harvesting machine which moves continuously relative to the cotton plants during the harvesting operation.

2

Another object is to provide a novel cotton harvesting machine which employs a tractor or light truck as its prime mover.

Another object is to provide a novel cotton harvesting machine which contains cotton stripping means which are driven from a power take-off adjacent the rear axle of the prime mover.

Another object is to provide a novel cotton harvesting machine which contains means for removing a portion of the dirt and leaf trash from the cotton after it has been picked and while it is yet in the machine.

Another object is to provide a novel cotton harvesting machine which employs a pair of spaced rotating brushes to strip the cotton from plants guided between them.

Another object is to provide a novel cotton harvesting machine which contains means for progressively stripping cotton from the top of a plant, downwardly toward the bottom thereof.

Another object is to provide a novel cotton harvesting machine which contains means for continuously transferring the cotton from the harvester while it is in motion, to a cart or truck following it.

Another object is to provide a novel cotton harvesting machine which is exceedingly simple in construction and which has relatively few moving parts.

Further objects and advantages of the present invention will be apparent from the following description, reference being had to the accompanying drawings wherein a preferred embodiment of the present invention is shown, in which:

Fig. 1 is a top plan view of a harvesting machine constructed in accordance with the teachings of the present invention, the prime mover being shown in dotted lines;

Fig. 2 is a rear elevational view of the machine taken from the right of Fig. 1;

Fig. 3 is a side elevational view of the machine taken from the left of Fig. 2;

Fig. 6 is a vertical transverse sectional view taken on the line 6—6 in Fig. 5.

Figure 4:
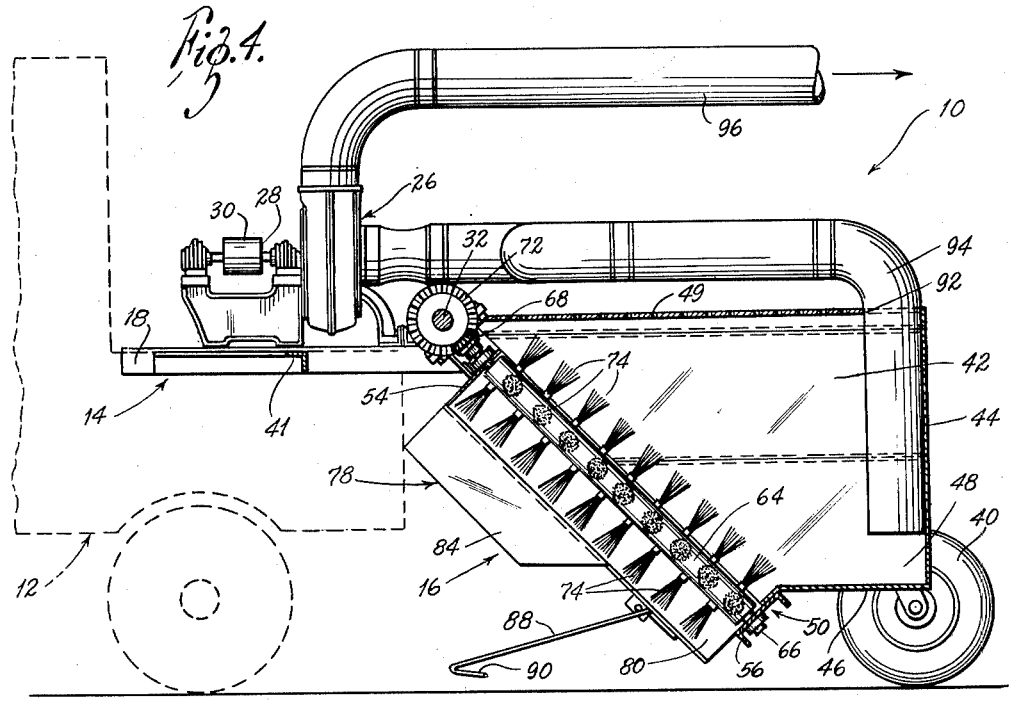
Fig. 4 is a vertical longitudinal sectional view taken on the line 4—4 in Fig. 1.

Referring to the drawings more particularly by reference numerals, 10 indicates generally a cotton harvesting machine embodying the teachings of the present invention, shown used with a light truck 12 as its prime mover.

The harvesting machine 10 includes a rectangular shaped framework 14 which is removably positioned on the rear portion of the truck body 12 so as to be supported thereby, and a picking mechanism housing 16 which is positioned at the rear and to one side of the framework 12 (Fig. 1). The framework 14 includes a pair of longitudinally extending structural angle members 18 adjacent the sides of the truck body and a plurality of spaced transversely extending members 20 fastened to said members 18.

A gasoline engine 22 is supported on several of the transversely extending members 20 adjacent one side of the framework 14, and contains a pulley 24. A suction pump 26 is mounted on the transversely extending members 20 adjacent the other side of the framework 14 directly opposite of the gasoline engine 22, and contains a pulley 28.

Extending between the pulleys 24 and 28 is a continuous belt 30 whereby the suction pump 26 can be driven by the gasoline engine 22, for a purpose to appear.

Fastened to the transversely extending members 20 adjacent the rear end of the framework 14 are a pair of journal bearings 31 which rotatably support a drive shaft 32 which extends transversely in front of the picking mechanism housing 16.

A sprocket gear 34 is fixedly mounted on the drive shaft 32 adjacent the center of the framework 14. A continuous chain belt 36 extends downwardly from the gear 34 to a power take-off 38 (Fig. 2) adjacent the rear axle of the prime mover 12, whereby the shaft 32 can be driven from the truck 12.

The front end of the picking mechanism housing 16 is fastened to the framework 14 and its rear end is supported by a pair of wheels 40. A bracing strut 41 extends diagonally between the framework 14 and the housing 16 (Fig. 1).

The housing 16 contains opposed vertical side walls 42, a vertical rear wall 44, and a concave bottom wall 46 (Fig. 2) which forms a well or sump 48 (Fig. 4) to receive the picked cotton.

A rectangular-shaped perforated plate 49, preferably curved, covers the top of the housing 16. The openings in the plate 49 are of a size to permit dirt and some leaf trash to pass through but to prevent the cotton from passing through them.

A rectangular-shaped brush cylinder supporting frame 50 (Fig. 5), which is formed from channel-shaped structural members, is fastened adjacent the open front end of the picking mechanism housing 16 in an oblique position, the frame 50 extending downwardly and rearwardly toward the rear end of the housing. The supporting frame 50 contains side members 52, a top member 54 and a bottom member 56. The top and bottom members 54 and 56 contain aligned openings 58. Bearing plates 60 containing openings therein are fastened to the said members adjacent the openings 58 by bolts 62.

A pair of spaced brush supporting cylinders 64 are rotatably supported within the frame 50. The cylinders 64 have shafts 66 extending from the ends thereof which are journaled in the bearing plates 60. The shafts 66 at the upper ends of the cylinders 64 extend beyond the top member 54 and contain bevelled gears 68 fastened adjacent their ends.

Spaced journal bearings 70 are fastened adjacent the top member 54 and rotatably support that portion of the drive shaft 32 which extends in front of the picking mechanism housing 16 (Figs. 1 and 2).

Bevelled gears 72 are fastened on the drive shaft 32 in front of the housing 16 and mesh with the bevelled gears 68 so as to simultaneously rotate the brush supporting cylinders 64 in the directions indicated in Fig. 6.

Figure 5:
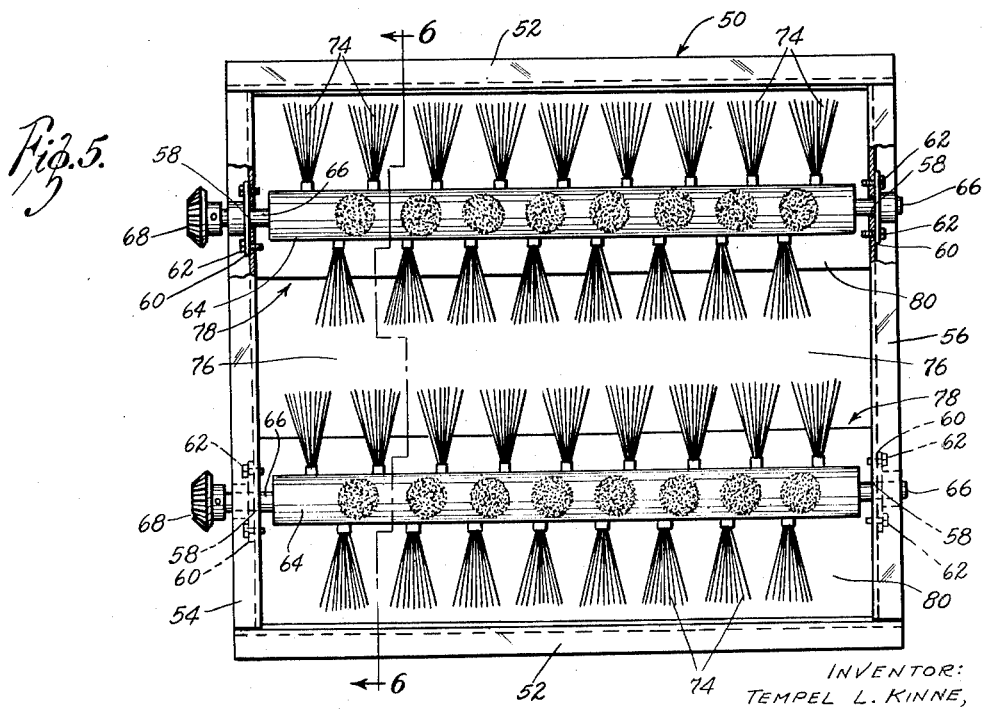
Fig. 5 is a plan view, partly in section, of a brush cylinder supporting frame included in the picking mechanism.

A series of outwardly extending finger-like members such as brushes 74 (Fig. 5) are supported on the surface of the cylinders 64 and extend outwardly normal thereto. The brushes 74 are preferably made of wire or like resilient material so that they will yield and return to their original position after striking an unyielding object without suffering permanent damage. The brushes 74 are spaced around each of the cylinders 64 in the form of a spiral so that they sweep downwardly over the cotton plants when the harvesting machine 10 is in operation, as will appear. As shown in Figs. 5 and 6, the cylinders 64 are spaced apart so that there is a passageway 76 between the tips of opposed brushes 74.

Shield members 78 (Fig. 6) are fastened to the side members 52 of the supporting frame 50 and extend downwardly and inwardly therefrom below the brush supporting cylinders 64. Each shield member 78 includes an inner arcuate portion 80 and an angular outer portion which has a flat inner surface 84 and a flat outer surface 86.

As shown in Figs. 3 and 4, the arcuate portions 80 extend substantially the full length of the side members 52, whereas the angular outer portions 84—86 terminate a predetermined distance short of the lower end of the side members 52.

Elongated stalk guides 88 are fastened to the arcuate portions 80 adjacent the lower ends thereof and extend downwardly and forwardly to a point a short distance above the ground. The stalk guides 88 are made of resilient material and contain a runner portion 90 at the free end thereof so that they will yield whenever they strike a mound of earth or a similar obstacle.

The baffle plate 49 on top of the picking mechanism housing 16 contains a circular opening 92 adjacent the rear edge thereof which is directly above the sump 48 (Fig. 4).

An inlet conduit 94 extends from the sump 48, upwardly through the opening 92, and then horizontally to the inlet side of the suction pump 26. Extending from the outlet side of the pump 26 is an outlet conduit 96 which leads to a receiving cart or truck which follows, or is pulled by the prime mover 12.

In operation, the gasoline engine 22 drives the suction pump 26 through the continuous belt 30 so that a vacuum is created adjacent the open end of the inlet conduit 94.

Also, the drive shaft 32, which extends in front of the picking mechanism housing 16, is driven in a clockwise direction as viewed in Figs. 3 and 4, from the power take-off 38 through the chain belt 36.

When the drive shaft 32 is rotated, the brush supporting cylinders 64 are driven through the bevel gears 72 and 68, whereby the bottoms of the cylinders 64 rotate toward each other and then upwardly.

As the picking mechanism housing 16 is driven over a row of cotton plants from which the cotton is to be removed, the plants are guided into the passageway 76 between the ends of the rotating brushes 74 by the stalk guides 88 and the inner surfaces 84 of the shield members 78.

The upper end of the plant is first contacted by the brushes 74 adjacent the upper ends of the cylinders 64, and, as the plant continues to pass through the passageway 76, the brushes sweep downwardly over the plant due to the inclination of the brush supporting cylinders 64 and the spiralling position of the brushes 74 around each of the cylinders.

The rotating brushes 74 sweep the cotton off of the plant stalks on each side thereof and hurl it upwardly and rearwardly against the perforated metal plate 49, causing some of the dirt and leaf trash to pass through the openings in the plate 49, into the atmosphere. The openings in the plate 49 are not large enough to permit the cotton to pass through them, however, so that it will fall onto the brushes 74 or into the arcuate portion 80 whereby it will be repeatedly hurled against the perforated plate 49 until it ultimately falls into the sump 48. Manifestly, some of the cotton will fall directly into the sump 48 from the perforated plate 49, but much of it will be hurled against the plate several times before falling into the sump.

From the sump 48, the cotton passes upwardly through the inlet conduit 94, through the suction pump 26, and out through the outlet conduit 96 into the cart or truck following the harvesting machine 10.

Thus it is apparent that there has been provided a novel cotton harvesting machine which fulfills all of the objects and advantages sought therefor.

It is extremely simple in design with a minimum number of moving parts. Furthermore, there is merely a rotating movement of the parts without any accompanying complicated inward and outward movement as is necessary with many of the harvesting machines in use at the present time.

The repeated hurling of the cotton against the perforated plate 49 causes a portion of the dirt and leaf trash to be separated from the cotton while it is in the machine, thereby providing a cleaner yield.

It is to be understood that the foregoing description and the accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. A cotton harvesting machine, comprising a mobile housing having a front end and a rear end; means for moving the housing over a row of cotton plants in a horizontal position; at least a pair of elongated brush supporting members rotatably mounted within the housing adjacent the front end thereof and extending upwardly relative to the housing and to the plane of the cotton plants when the machine is in use, both of said members being disposed at an angle relative to the horizontal axis of the housing so that the upper ends thereof extend forwardly relative to the housing beyond their lower ends; a series of brushes extending radially outwardly from said brush supporting members; and means for simultaneously rotating said members so that the lower surfaces thereof rotate toward each other in such a manner that the forward ends of said brushes engage the cotton plants at the top before engaging the lower portions.

2. A cotton harvesting machine, comprising a mobile housing having a front end and a rear end; means for moving the housing over a row of cotton plants in a horizontal position; a pair of brush supporting cylinders rotatably mounted within the housing adjacent the front end thereof, said cylinders extending upwardly relative to the housing and to the plane of the cotton plants when the machine is in use and being parallel and disposed at an angle to the horizontal axis of the housing so that the upper ends thereof extend forwardly relative to the housing beyond their lower ends; and a series of brushes extending radially outwardly from the surfaces of the cylinders normal thereto, the brushes being arranged in a spiral about each cylinder; the brush supporting cylinders being spaced apart to provide a passageway of predetermined width between the tips of opposed brushes in such a manner that the forward ends of said brushes engage the cotton plants at the top before engaging the lower portions.

3. A cotton harvesting machine, comprising a mobile housing having a forward end and a rearward end; means for moving the housing over a row of cotton plants in a horizontal position; a pair of spaced elongated brush supporting members rotatably mounted in the housing adjacent the forward end thereof; means for simultaneously rotating said members; a plurality of brushes fastened to said members and extending radially outwardly therefrom in a spiral about the cylinder, said members and brushes being positioned relative to the housing and to the plane of the cotton plants when the machine is in use to strip the cotton from plants passing between them and hurl it upwardly and rearwardly relative to the housing when the members are rotated; and sump-like means disposed rearwardly and beneath the centers of the members to receive the hurled cotton.

4. A cotton harvesting machine, comprising a mobile housing having a forward end and a rearward end; means for moving the housing over a row of cotton plants in a horizontal position; a pair of spaced elongated brush supporting members rotatably mounted in the housing adjacent the forward end thereof; means for simultaneously rotating said members; a plurality of brushes fastened to said members and extending radially outwardly therefrom, said members and brushes being positioned relative to the housing and to the plane of the cotton plants when the machine is in use to strip the cotton from plants passing between them and hurl it upwardly and rearwardly relative to the housing when the members are rotated; sump-like means disposed rearwardly and beneath the centers of the rotatable members; and means disposed above said members for deflecting the hurled cotton downwardly and rearwardly toward said sump-like means.

5. A cotton harvesting machine, comprising a mobile housing having a forward end and a rearward end; means for moving the housing over a row of cotton plants in a horizontal position; a pair of spaced elongated brush supporting members rotatably mounted in the housing adjacent the forward end thereof; means for simultaneously rotating said members, a plurality of brushes fastened to said members and extending radially outwardly therefrom, said members and brushes being positioned relative to the housing and to the plane of the cotton plants when the machine is in use to strip the cotton from plants passing between them and hurl it upwardly and rearwardly relative to the housing when the members are rotated; sump-like means disposed rearwardly and beneath the centers of the rotatable members; and a perforated plate-like member disposed above said rotatable members for deflecting the cotton downwardly and rearwardly toward said sump-like means.

6. A cotton harvesting machine, comprising a mobile housing having a forward end and a rearward end; means for moving the housing over a row of cotton plants in a horizontal position; a pair of spaced elongated brush supporting members rotatably mounted in the housing adjacent the forward end thereof; means for simultaneously rotating said members; a plurality of brushes fastened to said members and extending radially outwardly therefrom, said members and brushes being positioned relative to the housing and to the plane of the cotton plants when the machine is in use to strip the cotton from plants passing between them and hurl it upwardly and rearwardly relative to the housing when the members are rotated; sump-like means disposed rearwardly and beneath the centers of the rotatable members; and a perforated plate-like member disposed above said rotatable members for deflecting the hurled cotton downwardly and rearwardly toward said sump-like means, the openings in said plate-like member being of a size to prevent the passage of cotton therethrough, but to permit the passage of dust and some leaf trash.

7. A cotton harvesting machine, comprising a mobile housing having a forward end and a rearward end; means for moving the housing over a row of cotton plants in a horizontal position; a pair of spaced elongated brush supporting members rotatably mounted in the housing adjacent the forward end thereof; means for simultaneously rotating said members, a plurality of brushes fastened to said members and extending radially outwardly therefrom, said members and brushes being positioned relative to the housing and to the plane of the cotton plants when the machine is in use to strip the cotton from plants passing between them and hurl it upwardly and rearwardly relative to the housing when the members are rotated; sump-like means disposed rearwardly and beneath the centers of the members to receive the cotton hurled from said members; and means for continuously removing the cotton from only said sump-like means while the harvesting machine is in operation.

8. A cotton harvesting machine, comprising a mobile housing having a forward end and a rearward end; means for moving the housing over a row of cotton plants in a horizontal position; a pair of spaced elongated brush supporting members rotatably mounted in the housing adjacent the forward end thereof; means for simultaneously rotating said members, a plurality of brushes fastened to said members and extending radially outwardly therefrom, said members and brushes being positioned relative to the housing and to the plane of the cotton plants when the machine is in use to strip the cotton from plants passing between them and hurl it upwardly and rearwardly relative to the housing when the members are rotated; sump-like means disposed rearwardly and beneath the centers of the members to receive the cotton from said members; and means for removing the cotton from said sump-like means while the harvesting machine is in operation including a conduit and a suction pump, said conduit having its inlet end positioned within said sump.

9. A cotton harvesting machine, comprising a mobile housing open at the front and having opposed side walls, a rear wall, and a concave bottom wall forming a sump; means for moving the housing over a row of cotton plants in a horizontal position; a framework including a top and bottom member adjacent the open front end of the housing, said framework being disposed at an angle relative to the horizontal axis of the housing and to the plane of the cotton plants when the machine is in use and extending downwardly and rearwardly from the upper part of the housing; a pair of elongated brush supporting members rotatably mounted between said top and bottom members; a plurality of brushes fastened to said rotatable members and extending radially outwardly therefrom, the brushes being arranged in a spiral about each member; said brush supporting members being spaced apart to provide a passageway between the tips of opposed brushes; and shield-like members fastened to the framework at each side thereof for guiding cotton plants into said passageway, each of said shield-like members including an arcuate portion below a brush supporting member, and a panel-like portion fastened adjacent the inner edge of the arcuate portion and extending downwardly and outwardly therefrom.

10. A cotton harvesting machine, comprising a framework adapted to be supported by a light truck or the like; a housing fastened to said framework and disposed to the rear and to one side thereof; a sump adjacent the rear end of the housing; wheels on the housing to support the same so that it can be moved over a row of cotton plants; a drive-shaft rotatably supported on the framework and extending tranversely in front of said housing; a pair of spaced elongated brush-supporting members rotatably mounted in the housing in front of and extending above said sump; gear means between the drive shaft and said rotatable members for simultaneously rotating the latter; a plurality of brushes fastened to said rotatable members and extending radially outwardly therefrom, said members and brushes being positioned relative to the housing and to the plane of the cotton plants to strip the cotton from plants passing under the housing and hurl it upwardly and rearwardly toward the sump; a suction pump supported on said framework; and an inlet conduit extending from the inlet of the pump into said sump beneath the centers of said brushes.

11. A cotton harvesting machine, comprising a framework adapted to be supported by a light truck or the like; a housing fastened to said framework and disposed to the rear and to one side thereof; a sump adjacent the rear end of the housing; wheels on the housing to support the same so that it can be moved over a row of cotton plants; a drive-shaft rotatably supported on the framework and extending transversely in front of said housing; a pair of spaced elongated brush-supporting members rotatably mounted in the housing in front of and extending above said sump; gear means between the drive shaft and said rotatable members for simultaneously rotating the latter; a plurality of brushes fastened to said rotatable members and extending radially outwardly therefrom, said members and brushes being positioned relative to the housing and to the plane of the cotton plants to strip the cotton from plants passing under the housing and hurl it upwardly and rearwardly toward the sump; a perforated plate-like member across the upper end of the housing immediately above the brush-supporting members to deflect the cotton downwardly; a suction pump and means for operating it, supported on said framework; an inlet conduit extending from the inlet of the pump into said sump beneath the centers of said brushes; and an outlet conduit extending from the outlet of the pump to a point removed from the housing.

12. A mobile cotton harvesting machine, comprising a housing having a forward end and a rearward end; means for moving the housing over a row of cotton plants in a horizontal position; cotton picking mechanism adjacent the forward end of the housing positioned to strip the cotton from plants passing under the housing and hurl it upwardly and rearwardly relative to the housing; sump-like means in the housing disposed rearwardly of and beneath the center of the picking mechanism; and a perforated baffle member having the upper surface thereof open to the atmosphere, disposed above the picking mechanism for passage of debris and dust therethrough and to deflect the hurled cotton downward into the sump-like means.

TEMPEL LEROY KINNE.

References Cited in the file of this patent

UNITED STATES PATENTS

| Number | Name | Date |
|---|---|---|
| 359,724 | Hanks | Mar. 22, 1887 |
| 526,209 | Whitney | Sept. 18, 1894 |
| 1,378,021 | Gipson | May 17, 1921 |
| 1,722,747 | Hentz | July 30, 1929 |
| 1,731,717 | Friend | Oct. 15, 1929 |
| 1,836,547 | Onsrud | Dec. 15, 1931 |
| 2,475,531 | Townsend | July 15, 1949 |